United States Patent [19]

Amitay et al.

[11] Patent Number: 4,737,004
[45] Date of Patent: Apr. 12, 1988

[54] EXPANDED END OPTICAL FIBER AND ASSOCIATED COUPLING ARRANGEMENTS

[75] Inventors: Noach Amitay, Tinton Falls; Herman M. Presby, Highland Park, both of N.J.

[73] Assignee: American Telephone and Telegraph Company, AT&T Bell Laboratories, Murray Hill, N.J.

[21] Appl. No.: 783,629

[22] Filed: Oct. 3, 1985

[51] Int. Cl.⁴ ............................................. G02B 6/26
[52] U.S. Cl. .............................. 350/96.15; 350/96.16
[58] Field of Search ................. 350/96.15, 96.16, 96.18

[56] References Cited

U.S. PATENT DOCUMENTS

| | | | |
|---|---|---|---|
| 3,756,688 | 9/1973 | Hudson et al. | 350/96.16 |
| 3,779,628 | 12/1973 | Kapron et al. | 350/96.15 |
| 3,832,028 | 8/1974 | Kapron | 350/96.31 |
| 3,954,338 | 5/1976 | Hennel et al. | 350/96.21 X |
| 4,060,309 | 11/1977 | Le Noane et al. | 350/96.18 |
| 4,130,345 | 12/1978 | Doellner | 350/96.15 X |
| 4,205,901 | 6/1980 | Ramsay et al. | 350/96.31 |
| 4,380,365 | 4/1983 | Gross | 350/96.18 |

FOREIGN PATENT DOCUMENTS

| | | | |
|---|---|---|---|
| 1541787 | 3/1979 | United Kingdom | 350/96.15 |
| 2020447 | 11/1979 | United Kingdom | 350/96.16 |

OTHER PUBLICATIONS

"Horn Structures for Integrated Optics", Chen et al., Optics Communications, vol. 20, No. 2, Feb. '77, pp. 250–252.
Bell System Tech. Jrnl., vol. 52, No. 8, Oct. 1973, Cook et al., pp. 1439–1448.
Electronics Letters, vol. 11, No. 18, Sep. 4, 1975, Weidel, pp. 436–437.
Proceedings of the IEEE, vol. 64, No. 6, Jun. 1976, Yamamoto et al., pp. 1013–1014.
Applied Optics, vol. 23, No. 23, Dec. 1, 1984, Joyce et al., pp. 4187–4196.

Primary Examiner—John Lee
Assistant Examiner—Michael Menz
Attorney, Agent, or Firm—Erwin W. Pfeifle

[57] ABSTRACT

An optical fiber is disclosed which comprises (a) a central core section of constant thickness which terminates in an outwardly gradually expanded end section, and (b) a cladding layer enveloping the core. Both the core and the cladding layer are of constant compositions throughout the fiber's length and width. Additionally, the difference between the refractive indices of the core and the cladding layer remains constant throughout the length of the fiber. Where the core gradually increases in width in the outwardly expanded end section of the fiber, the V number increases in like manner. In such optical fiber, propagation of a predetermined mode or modes is maintained throughout the entire length of the fiber, so long as the expansion of the end section occurs gradually over the order of many wavelengths.

9 Claims, 7 Drawing Sheets

EXPANDED END OPTICAL FIBER AND ASSOCIATED COUPLING ARRANGEMENTS

TECHNICAL FIELD

The present invention relates to a gradually expanded end optical fiber and associated coupling arrangements, and, more particularly, to an optical fiber including (a) a core and cladding layer with a first and second uniform index of refraction, respectively, throughout, and (b) a gradually expanded end section that maintains a mode or modes propagating in the fiber by an adiabatic transition as the dimensions increase in the expanded end section. The gradually expanded end section relaxes tolerances associated with, for example, lateral and axial displacements of two coupled surfaces and enhances use in applications such as connectors, attenuators, low loss directional and light source couplers and optical switching of lightwave energy.

DESCRIPTION OF THE PRIOR ART

Single-mode fiber is rapidly becoming the medium of choice for lightwave communications systems carrying long distance terrestrial and submarine traffice as well as local distribution and local area network traffic. However, widespread and convenient utilization of single-mode fibers requires reliable and reasonably priced hardware such as low-loss backplane and field connectors, laser-fiber couplers, and directional couplers. the single mode fiber's small core size (on the order of 5–10 microns), unfortunately, makes the fabrication of these components difficult. The coupling efficiency achieved with the use of any hardware item that aligns two single-mode cores, or a light source and a single-mode core, is inherently very sensitive to axial and transversal displacements of the coupled fibers, as well as to dust particles which may settle on the coupled surfaces.

It has been suggested that these tolerances may be relaxed by utilizing the technique of mode evolution coupling in a reduced size single-mode fiber. In this regard, see the article "A Large-Tolerant Single-Mode Optical Fiber Coupler with a Tapered Structure" by Y. Yamamoto et al. in *Proceedings of the IEEE*, June 1976, Vol. 64, No. 6, pp. 1013–1014.

Optical beam expansion techniques for alleviating these problems have also been used in the prior art. As described in the article entitled "New Coupling Method for GaAs-Laser-Fibre Coupling" by E. Weidel in *Electronic Letters*, Sept. 4, 1975, Vol. 11, pp. 436–437, components which can comprise cylindrical lenses are used to increase the single-mode spot size and thus reduce alignment sensitivities.

Another beam-expansion approach, set forth in U.S. Pat. No. 4,205,901 issues to M. M. Ramsay et al. on June 3, 1980, is the fabrication of an optical fiber having a central core region of uniform composition and thickness, and core end regions each having a core with a graded composition and increasing thickness towards the ends of the fiber.

The problem remaining in the prior art is the straightforward and inexpensive implementation of an optical fiber arrangement that reduces the effects of dust and lateral and axial displacements on the butt-joint coupling efficiency while preserving a predetermined mode throughout the lengths of coupled fibers.

SUMMARY OF THE INVENTION

The foregoing problem in the prior art has been solved in accordance with the present invention, which relates to a gradually expanded end optical fiber and associated coupling arrangements that permits relaxation of tolerances associated with, for example, axial and lateral displacements of the coupled surfaces, while preserving the propagation of one or more predetermined modes throughout the lengths of the coupled fibers.

It is an aspect of the present invention to provide an expanded end optical fiber comprising (a) a core and a cladding layer with a constant first and second index of refraction, respectively, throughout the optical fiber's length and width, and (b) a gradually expanded core end section. In the gradually expanded core end section, the core increases gradually in width over the order of many wavelengths toward the end of the fiber while the V number increases in like manner with the increasing dimensions. This gradual adiabatic increase maintains a mode or modes propagating in the fiber. With such optical fiber arrangement, tolerances are relaxed and predetermined mode of propagation is preserved when used in applications such as connectors, attenuators, low loss directional and light source couplers and optical switching of lightwave energy.

DETAILED DESCRIPTION

Figure 1:
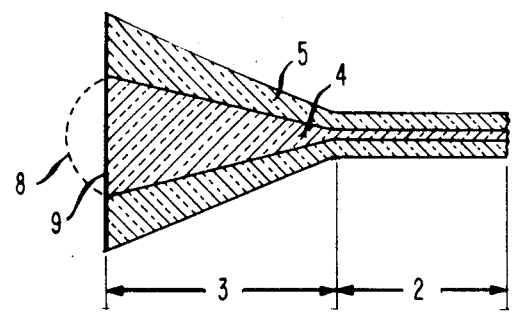
FIG. 1 illustrates an optical fiber including a gradually expanded end in accordance with the present invention.
Figure 2:
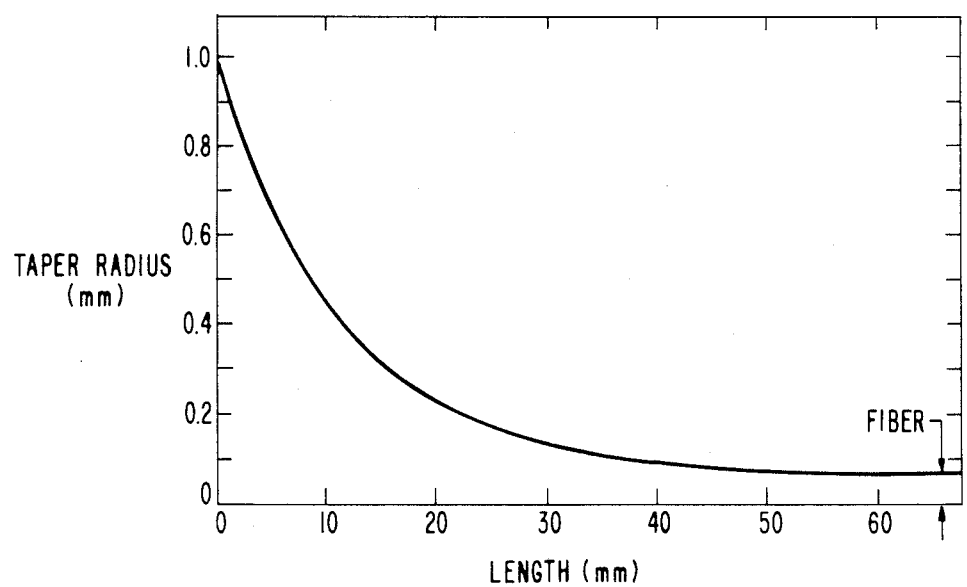
FIG. 2 is a typical plot relating fiber radius vs. length from the end of the optical fiber of FIG. 1.

FIG. 1 shows a single mode optical fiber in accordance with the present invention which comprises a central cylindrical section 2 and an outwardly gradually expanding end section 3, where the length of the outwardly gradually expanding end section is designed to be much greater than the wavelength of the light propagating along the fiber. FIG. 2 shows a curve of a typical profile of width vs. length of gradually expanding end section 3 as measured from the end of the single mode expanded-end optical fiber. The fiber further comprises a core 4 including a first index of refraction $n_1$ which remains constant throughout the length of the fiber, and a cladding layer 5 enveloping core 4 and including a second or multiple indices of refraction $n_2$, which also remains constant throughout the length of the fiber and is less than the first index of refraction $n_1$. As is well known in the art of fiber optics, the normalized frequency V is given by the equation $$V = 2\pi \lambda^a (n_1^2 - n_2^2)^{\frac{1}{2}} \quad (1)$$

where a is the radius of core 4, and λ is the wavelength of the light signal propagating in core 4. Because, in accordance with the present invention, the difference between indices of refraction $n_1$ and $n_2$ remains constant throughout the length of the fiber, the normalized frequency V thus varies only with the radius of core 4, remaining constant along central cylindrical section 2 and increasing with core width along outwardly expanding end section 3. Although this suggests that outwardly gradually expanding end section 3 can support multimode propagation, the fiber will preserve propagation of a predetermined mode, or modes, throughout its entire length, provided that the length of outwardly expanding expanding end section 3 is much greater than the wavelength of the signal propagating in core 4.

Figure 3:
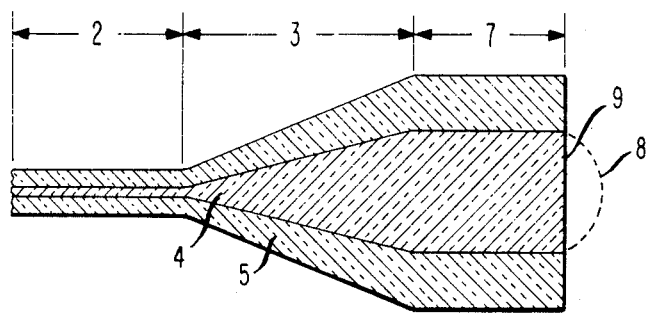
FIG. 3 is an alternative arrangement of the gradually expanded end optical fiber of FIG. 1.

FIG. 3 illustrates a preferred embodiment of the present invention which is an extension of the arrangement of FIG. 1 in that the fiber further comprises a cylindrical end section 7 including a diameter which matches the expanded end of the outwardly gradually expanded end of section 4. The arrangement of FIG. 3 is advantageous for simple mechanical mounting of the fiber within couplers. As described for the arrangement of FIG. 1, in the fiber the resultant V value (a) remains constant along central cylindrical section 2, (b) increases with core width in outwardly gradually expanding end section 3 and (c) remains constant in cylindrical end section 7. Propagation of a predetermined mode or modes is, however, preserved throughout the length of the fiber provided that the V value associated with central cylindrical sectio 2 is sufficient to propagate the desired mode(s) and that the length of outwardly expanded end section 3 is much greater than the wavelength propagating in fiber 1. The addition of a lens 8 to the expanded end 9 of core 4 in the arrangements of FIGS. 1 or 3 may be called for in some applications as will be described in greater detail hereinafter in the discussion of the optical source-to-fiber coupling arrangement of FIG. 11. The lens 8 can be formed by cementing a discrete lens to the end of core 4 or, preferably, by forming the lens from the end 9 of the core itself by any technique well known in the art.

The end sections 3 and 7 of optical fiber 1 of FIGS. 1 and 3 may be preferably manufactured in, for example, the normal fiber drawing process. In the normal drawing process, a preform rod is heated and the end thereof is pulled in a continuous manner to reduce its size to that of a desired optical fiber. In the normal preform-to-fiber drawing process, a preform outside diameter of, for example, 16 mm is tapered down to, for example, a typical 125 microns of a drawn single mode fiber, giving an exemplary taper ratio of 128:1. In such example, a core diameter of about 1 mm in the preform would thus taper down to about 8 microns in the drawn single mode fiber. By scoring and breaking off the preform at a suitable point along the taper between the preform and the drawn fiber, a core diameter of about 100 microns can be obtained at the break point. The outside diameter of the cladding layer of these scored fibers would conveniently be on eht order of, for example, 1 mm. After scoring and breaking the tip of the preform at the desired point, a flatter and smoother end may be obtained by further cutting the end with a diamond saw and then polishing it, if necessary, to obtain the arrangement of FIG. 3.

It is to be understood that the gradually expanded end optical fiber of FIG. 3 can also be fabricated by other techniques more amenable to mass production. These techniques include appropriately modulating the speed of the fiber takek-up drum during the pulling process to form gradually expanding end sections 3 and then cylindrical end sections 7 at desired points along the drawn fiber, as well as pulling reduced diameter preform rods already equal to the desired final end diameter.

Figure 4:
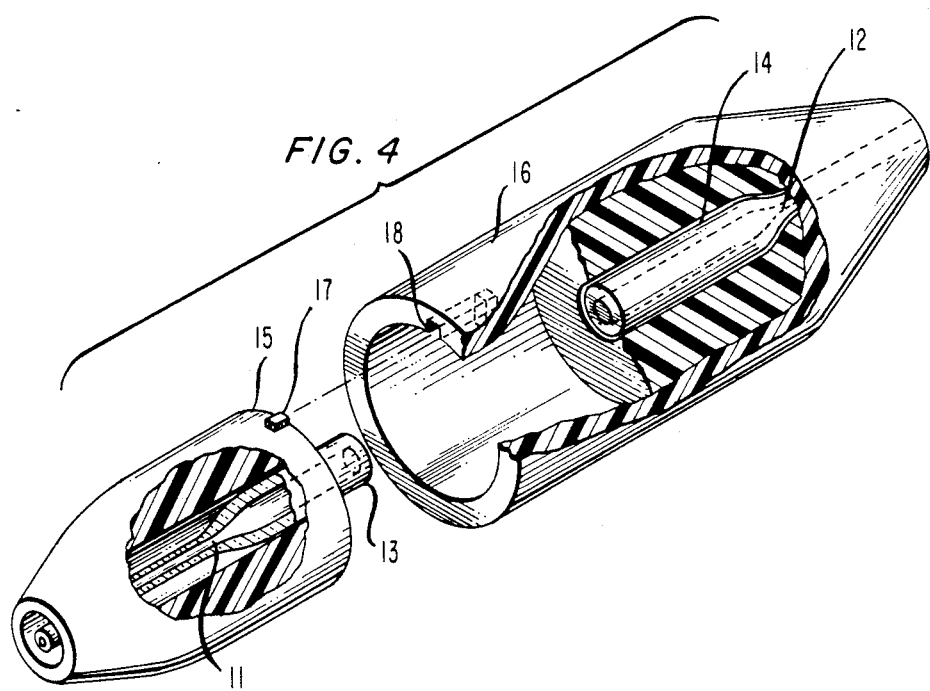
FIG. 4 shows a two-fiber coupling arrangement including two of the optical fibers shown in FIG. 3.
Figure 5:
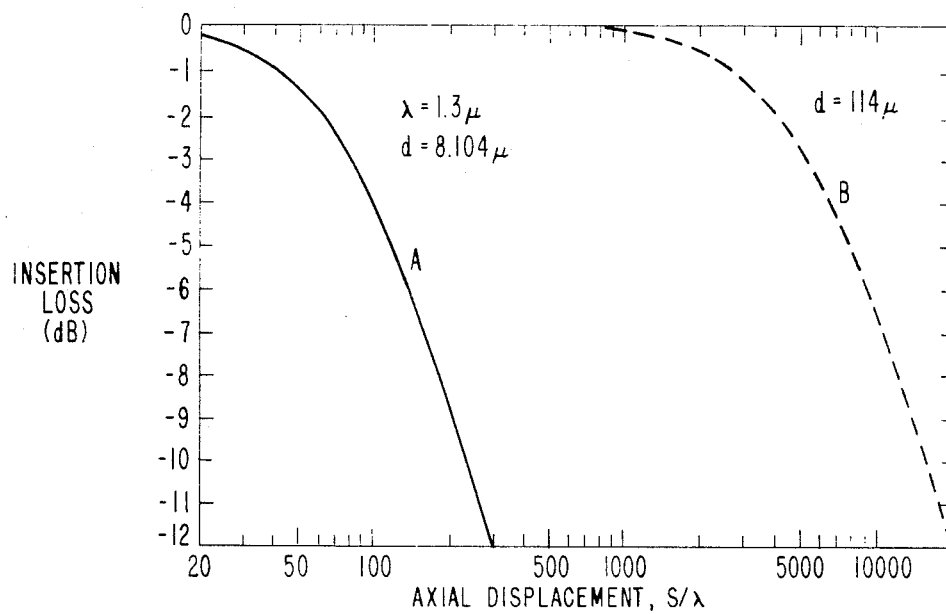
FIG. 5 is a typical plot relating insertion loss to axial displacement for the coupling arrangement of FIG. 4 compared to standard fiber-to-fiber coupling arrangements.
Figure 6:
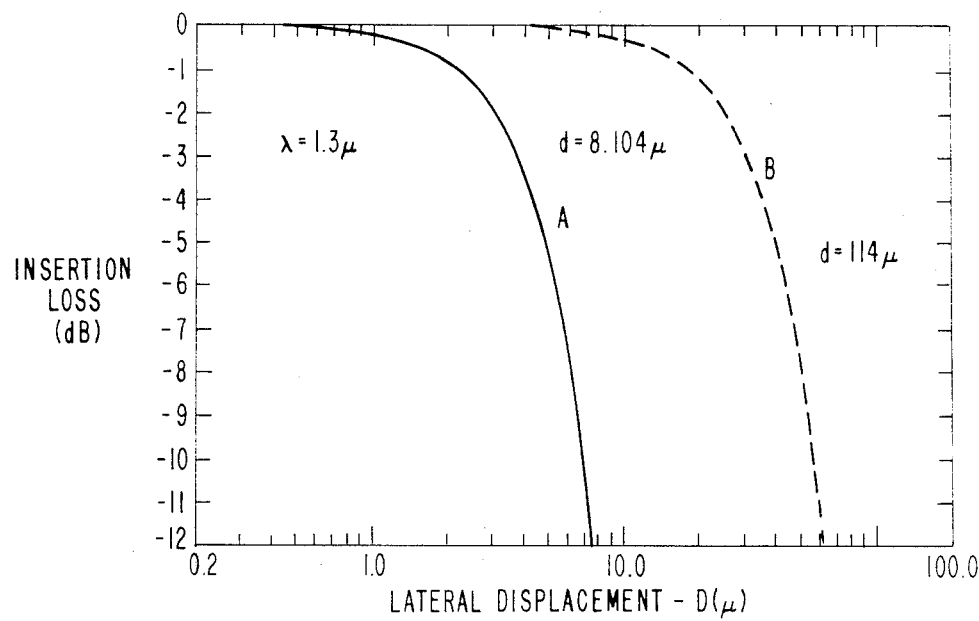
FIG. 6 is a typical plot relating insertion loss to lateral displacement for the coupling arrangement of FIG. 4 compared to standard fiber-to-fiber coupling arrangements.

The improved tolerances provided by the disclosed gradually expanded end fibers may advantageously be used in numerous applications. For example, a two-fiber coupling arrangement, using the fiber arrangement of FIG. 3, may be implemented between a first fiber 11 and a second fiber 12 as shown in FIG. 4. The enlarged cylindrical end sections 13 and 14 of first and second fibers 11 and 12, respectively, permit the relaxation of the tolerances associated with axial (S) and lateral (D) displacement when coupling the two fibers together. In a well known coupling arrangement shown in FIG. 4, the first gradually expanded end fiber 11 is inserted into a male end 15 of the connector, while the second gradually expanded end fiber 12 is inserted into a female end 16 of the connector. When the key 17 on male end 15 is inserted into keyway 18 of female end 16 and rotated into a locked position, the ends of first and second fiber 11 and 12 are adjacent to each other and aligned. It is to be understood that any suitable simple and inexpensive connector as, for example, one similar to the AT&T ST-series connector can thus be used to couple energy between the first and second gradually expanded end fibers 11 and 12, resulting in a possible loss that is significantly lower per unit displacement distance than that which would be found using a connector of similar precision to couple energy between standard single mode fibers. In this regard, see FIGS. 5 and 6, which show typical curves of insertion loss vs. axial and lateral displacement in two-fiber coupling arrangements using standard single mode fibers (curve A) having core widths of 8.104 microns and expanded end single mode fibers (curve B) having core end widths of 114 microns.

Figure 7:
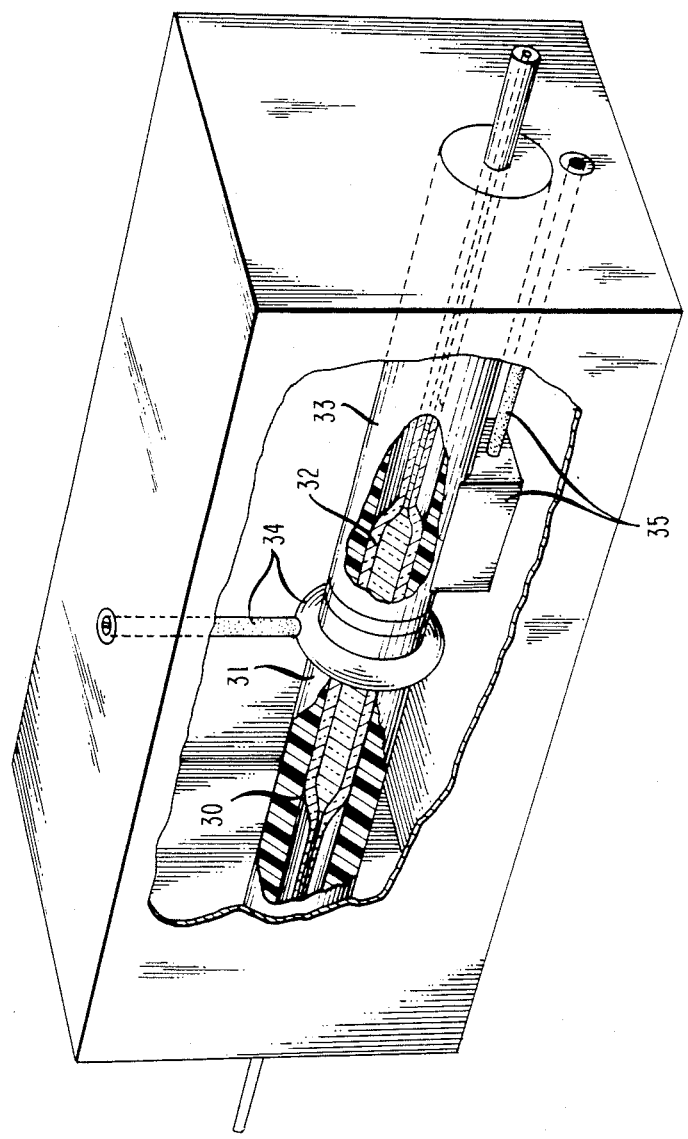
FIG. 7 illustrates an optical attenuator coupling arrangement for laterally or axially displacing two gradually expanded end optical fibers of FIG. 3.

The two-fiber coupling arrangement of FIG. 4 may be modified to form an optical attenuator by replacing the connector of FIG. 4 with an attenuation means as shown in FIG. 7. A first gradually expanded end fiber 30 is inserted into a first mechanical guide 31 of the attenuation means, while a second gradually expanded end fiber 32 is inserted into a second mechanical guide 33 of the attenuation means. Attached to either mechanical guide 31 or 33 may be an axial adjustment means 34 for axially altering the position of the appropriate gradually expanded end fiber with respect to the other gradually expanded end fiber and/or a lateral adjustment means 35 for laterally altering the position of the appropriate gradually expanded end fiber with respect to the other gradually expanded end fiber. Such adjustment means would provide a tight and reproducible control over how much light is coupled between first fiber 30 and second fiber 32. It is to be understood that any appropriate attenuation means such as, for example, one similar to the variable optical attenuator arrangement obtainable from JDS Optics, can thus be used to attenuate the coupling of light between optical fibers 30 and 32.

Figure 8:
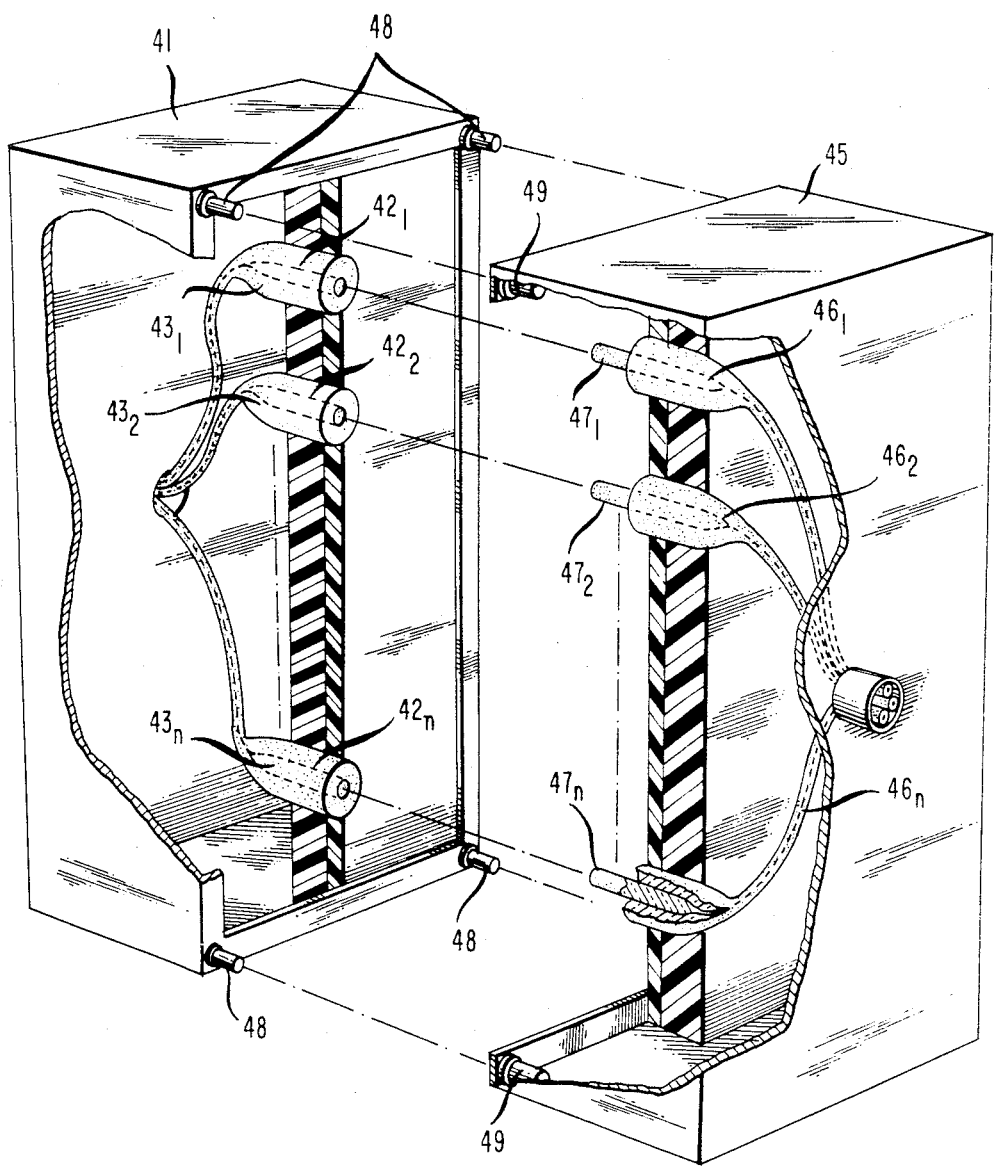
FIG. 8 shows a backplane coupling arrangement for a plurality of optical fibers according to FIG. 3.

The improved tolerances of gradually expanded end fibers also make them ideal for use in back-palne connectors as shown in FIG. 8, wherein strict alignment control is given up in exchange for the convenience of simple plug-in coupling. A typical back plane coupler shown in FIG. 8, such as the commercially available AT&T FASTECH ™ Multifiber Array Connector which includes a first housing 41, comprising one or more mechanical guides $42_i$, each of which holds a separate fiber $43_i$; and a separate second housing 45 comprising one or more mechanical guides $46_i$, each of which holds a gradually expanded end fiber $47_i$ that is to be coupled to a matched gradually expanded end fiber $43_i$. First housing 41 further includes one or more plug-in alignment connectors 48 corresponding to matching connectors 49 included in second housing 45. Connectors 48 and 49 and fiber mechanical $42_i$ and $46_i$ are to be positioned in housings 41 and 45 such that the gradually expanded end fibers $43_i$ to $43_n$ are each reasonably well-aligned with matched gradually expanded end fibers $47_1$ to $47_n$, respectively, to reduce coupling loss.

Figure 9:
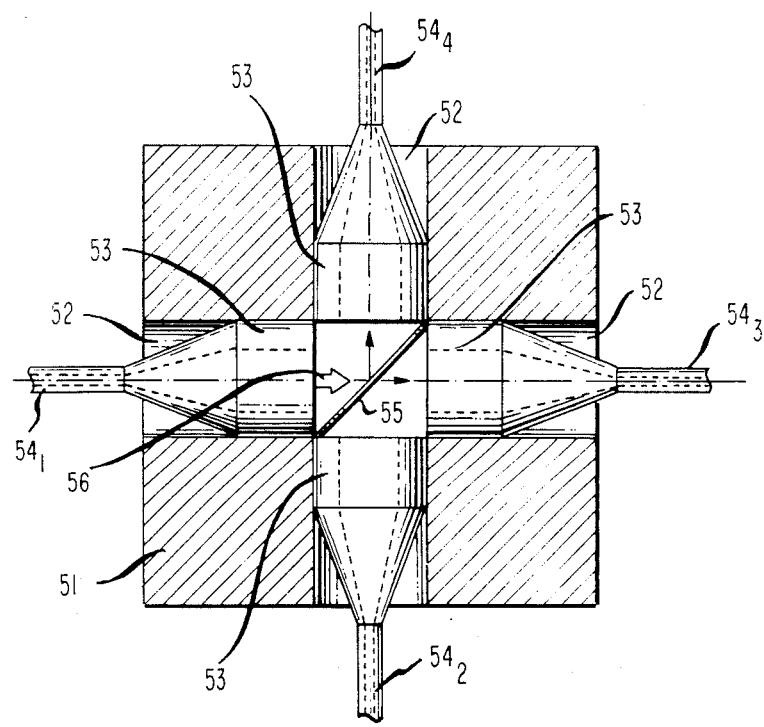
FIG. 9 shows a directional coupling arrangement mounted on an etched silicon substrate using optical fibers in accordance with FIG. 3, wherein a separate quasi-transparent membrane is used for reflective coupling.

Directional coupling between three or four gradually expanded end fibers of FIG. 3 may be accomplished through an arrangement such as that shown in FIG. 9. FIG. 9 is a top view of an exemplary four gradually expanded end fiber coupler which includes a silicon substrate 51 with etched grooves 52 to guide the cylindrical fiber, expanded-end, sections 53 of fibers $54_1$ to $54_4$ that are to be coupled, and a quasi-transparent reflecting means 55 whose coating determines how much incident light 56 from, for example, fiber $54_1$ is coupled to each of the two receiving fibers $54_3$ and $54_4$. In the four fiber coupler of FIG. 9, light originating from any of the four fibers $54_1$ to $54_4$ will be coupled to two other fibers; the fiber which is diametrically opposed to the fiber of origin, and the fiber to which quasi-transparent reflecting means 55 would reflect light from said fiber of origin. It is to be understood that a three fiber coupler can be implemented by removing an appropriate one of the four fibers in FIG. 9.

Figure 10:
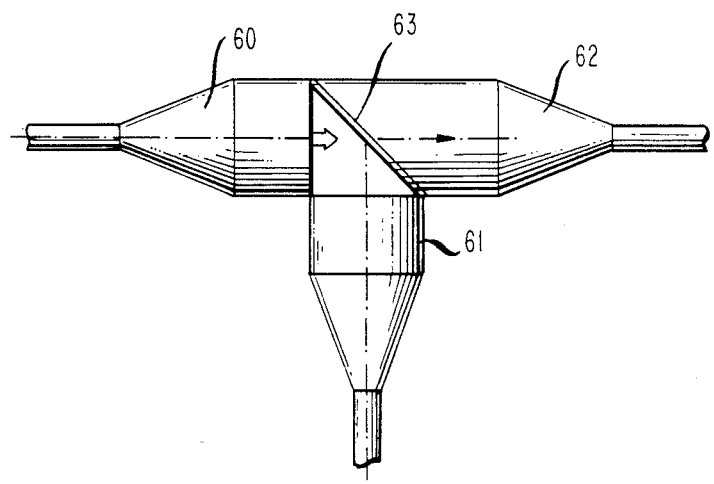
FIG. 10 depicts a directional coupling arrangement wherein no separate quasi-transparent membrane is needed for reflective coupling, as in the arrangement of FIG. 9.

Need for a separate quasi-transparent reflecting means may be eliminated using a three-fiber directional coupling arrangement such as that shown in FIG. 10. As shown in FIG. 10, the arrangement comprises first and second gradually expanded-end fibers 60 and 61, and an additional gradually expanded-end fiber 62, whose end is cut at an angle and coated with a coating 63 such that light from first fiber 60 may be coupled to second and third fibers 61 and 62 (as shown in FIG. 10), light from second fiber 61 may be reflectively coupled to first fiber 60, and light from third fiber 62 may be coupled to first fiber 60. Coating 63 functions to determine how much light is reflectively coupled, as is well known in the art.

Figure 11:
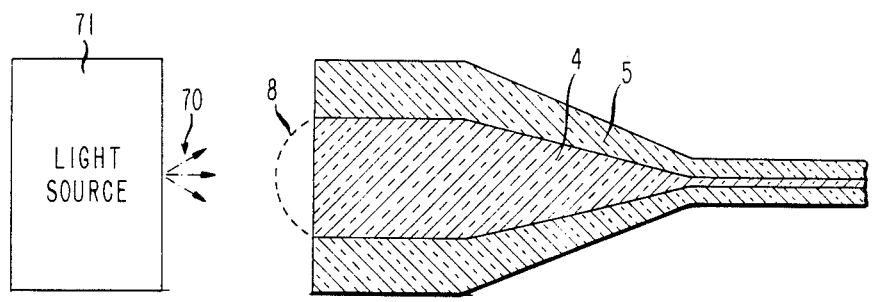
FIG. 11 illustrates a light source to fiber coupling arrangement using the optical fibers of FIG. 3.

An optical source-to-fiber coupling arrangement, as shown in FIG. 11, may also be implemented with the gradually expanded end fiber arrangement disclosed in FIG. 3. In such an application, the optional lens 8 of FIG. 3 may be used to help focus the output beam 70 of optical source 71 into core 4 and thus reduce loss from the rapidly diverging beam. If not corrected, the output beam 70 of optical source 71 would continue to diverge from the longitudinal axis of core 4 eventually being lost through or continuously reflected by cladding layer 5. Output beam 70 of optical source 71 may be corrected by aligning it with the longitudinal axis of a core 4 terminating in a lens 8, such that the output beam 70 of optical source 71 may be focused into said longitudinal axis as it passes through lens 8.

What is claimed is:

1. An optical fiber arrangement comprising:
   a single mode optical fiber for propagating a predetermined mode including
   a core formed from an optical material comprising a first substantially constant index of refraction in both a first section of constant first thickness extending to a first lengthwise boundary, and a second section wherein the thickness of the core gradually increases outwardly in a predetermined curved manner with an increasing slope from the first thickness at the first lengthwise boundary for a predetermined distance to a second thickness at a second lengthwise boundary in a manner to preserve propagation of the predetermined mode in either direction in the first and second sections; and
   a cladding layer surrounding the core and formed from an optical material comprising a second refractive index or indices which is lower than said first refractive index.

2. An optical fiber arrangement according to claim 1 wherein:
   the core and cladding layer further include a third section (of a constant thickness equal to the second thickness) at said second lenghtwise boundary, said third section extending in a cylindrical manner from the second lengthwise boundary to a third lengthwise boundary at the end of the fiber and forming a smooth transition between the outwardly expanding core in the second section and the cylindrically shaped core in the third section to preserve the propagation of the predetermined mode.

3. An optical fiber arrangement according to claim 1 or 2 wherein the core further includes:
   a lens-like structure disposed at the end of the core with the second thickness for correcting the path of light rays propagating into said core through said lenslike structure such that diverging light rays entering said lens-like structure are directed into the core at angles less than the critical angle $\theta_c$, which is defined by $\sin\theta_c = n_2/n_1$, where $n_2$ represents said second index of refraction and $n_1$ represents said first index of refraction.

4. An optical fiber arrangement according to claim 1 or 2 comprising:
   a second single mode optical fiber for propagating the predetermined mode, the second optical fiber comprising a first and a second section which correspond in structure to the first and the second section, respectively, of the first single mode optical fiber; and
   coupling means for substantially aligning the first single mode optical fiber with the second single mode optical fiber in an adjacent manner so that light propagating in the core of either one of the first and second single mode optical fibers is coupled between the cores of said first and second single mode optical fibers.

5. An optical fiber arrangement according to claim 4 wherein the coupling means comprises:

adjustment means for laterally and/or axially altering the position of any one of said first and second single mode optical fibers with respect to the other of said optical fibers for controlling the amount of light coupled between the first and second single mode optical fibers.

6. An optical fiber arrangement according to claim 2 comprising:

a first plurality of said single mode optical fibers, each optical fiber of said first plurality of single mode optical fibers comprising a first, second and third section corresponding to the first, second and third section of the first single mode optical fiber.

a second plurality of said single mode optical fibers, each optical fiber of said second plurality of single mode optical fibers comprising said first, second and third sections corresponding to the first, second and third sections of a separate one of the first plurality of single mode optical fibers;

a plurality of first mechanical guides mounted in a predetermined parallel relationship to each other in a first housing for forming a first part of a multiple fiber coupling arrangement, each of the first mechanical guides supporting a separate one of the first plurality of single mode optical fibers;

a plurality of second mechanical guides mounted in a predetermined parallel relationship to each other in a second housing for forming a second part of the multiple fiber coupling arrangement, each second mechanical guide mounting a separate one of the second plurality of single mode optical fibers such that when the first and second housings are placed end-to-end adjacent each other, corresponding parts of the first and second plurality of single mode optical fibers are substantially aligned for transferring light therebetween.

7. An optical fiber arrangement according to claim 1 or 2, the arrangement further comprising:

a second and a third single mode optical fiber wherein the second and third single mode optical fibers each comprise a first and a second section which correspond in structure to the first and the second section, respectively, of the first single mode optical fiber;

means for orienting the first, second and third single mode optical fibers such that the ends of the fibers are spaced apart and adjacent each other in a predetermined orientation; and quasi-transparent reflection means disposed between said fiber ends such that (a) part of the light originating from said first single mode optical fiber is reflectively coupled by said reflection means into said second single mode optical fiber and the remainder of said light originating from said first single mode optical fiber passes through said reflection means for coupling into the third single mode optical fiber, (b) light originating from said second single mode optical fiber can be reflectively coupled by said reflection means into said first single mode optical fiber and (c) light originating from the third single mode optical fiber passes through said reflection means for coupling into said first single mode optical fiber.

8. An optical fiber arrangement according to claim 2, the arrangement further comprising:

a second and third single mode optical fiber each optical fiber comprising a first, a second and a third section which correspond in structure to the first, second and third section, respectively, of said first single mode optical fiber, the third section of said third single mode optical fiber terminating in a slanted end which is coated with a quasi-transparent material such that (a) part of the light originating from said first single mode optical fiber is reflectively coupled by said slanted end into said second single mode optical fiber and the remainder of the light originating from said first single mode optical fiberpasses through said slanted end for coupling into said third single mode optical fiber, (b) light originating from siad second single mode optical fiber is reflectively coupled by said slanted end into said first single mode optical fiber and (c) light originating from said third single mode optical fiber passes through said slanted end for coupling into said first single mode optical fiber.

9. An optical fiber arrangement according to claim 3, the arrangement further comprising:

a light source disposed adjacent the end of the single mode optical fiber section including the second thickness, wherein the core of the single mode optical fiber is substantially axially aligned to substantially receive an output light beam from said light source.

* * * * *